United States Patent
Valera et al.

(10) Patent No.: US 12,345,891 B2
(45) Date of Patent: Jul. 1, 2025

(54) DEVICE AND METHOD FOR COMPENSATING EFFECTS OF PANTOSCOPIC TILT OR WRAP/SWEEP TILT ON AN IMAGE PRESENTED ON AN AUGMENTED REALITY OR VIRTUAL REALITY DISPLAY

(71) Applicant: Snap Inc., Santa Monica, CA (US)

(72) Inventors: Mohmed Salim Valera, Sutton Coldfield (GB); David Louis Maxime Poussin, London (GB)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/263,837

(22) PCT Filed: Dec. 7, 2021

(86) PCT No.: PCT/EP2021/084652
§ 371 (c)(1),
(2) Date: Aug. 1, 2023

(87) PCT Pub. No.: WO2022/167125
PCT Pub. Date: Aug. 11, 2022

(65) Prior Publication Data
US 2024/0094536 A1    Mar. 21, 2024

(30) Foreign Application Priority Data
Feb. 5, 2021    (EP) .................................... 21155624

(51) Int. Cl.
*G02B 27/01*    (2006.01)
*F21V 8/00*    (2006.01)
*G02B 27/42*    (2006.01)

(52) U.S. Cl.
CPC ....... *G02B 27/0172* (2013.01); *G02B 6/0016* (2013.01); *G02B 27/4222* (2013.01); *G02B 27/4272* (2013.01)

(58) Field of Classification Search
CPC .............. G02B 27/0172; G02B 6/0016; G02B 27/4222; G02B 27/4272
(Continued)

(56) References Cited

U.S. PATENT DOCUMENTS

2017/0039655 A1    2/2017   Zarate Santovena et al.
2018/0120559 A1*   5/2018   Yeoh .................. G02B 26/0833
(Continued)

FOREIGN PATENT DOCUMENTS

CA    3051414 A1  *  8/2018  ............. B82Y 20/00
CN    116917663 A    10/2023
(Continued)

OTHER PUBLICATIONS

U.S. Appl. No. 63/049,824, filed 2020.*
(Continued)

*Primary Examiner* — Kwin Xie
(74) *Attorney, Agent, or Firm* — Schwegman Lundberg & Woessner, P.A.

(57)    ABSTRACT

An optical device is disclosed for use in an augmented reality or virtual reality display, comprising a waveguide (12; 22; 32) and an input diffractive optical element (H0; H3; 34) positioned in or on the waveguide, configured to receive light from a projector and couple it into the waveguide so that it is captured within the waveguide under total internal reflection. The input diffractive optical element has an input grating vector (G0; $G_{ig}$) in the plane of the waveguide. The device includes a first diffractive optical element (H1; H4) and a second diffractive optical element (H2; H5) having first and second grating vectors (G2, G3; GV1, GV2)
(Continued)

respectively in the plane of the waveguide, wherein the first diffractive optical element is configured to receive light from the input diffractive optical element and to couple it towards the second diffractive optical element, and wherein the second diffractive optical element is configured to receive light from the first diffractive optical element and to couple it out of the waveguide towards a viewer. The input grating vector, the first grating vector and the second grating vector have different respective magnitudes, and wherein a vector addition of the input grating vector, the first grating vector and the second grating vector sums to zero.

12 Claims, 14 Drawing Sheets

(58) Field of Classification Search
USPC .............................................................. 345/8
See application file for complete search history.

(56) References Cited

U.S. PATENT DOCUMENTS

| | | | | |
|---|---|---|---|---|
| 2020/0117003 | A1* | 4/2020 | Pfeiffer | G02B 6/4204 |
| 2020/0264378 | A1* | 8/2020 | Grant | G02B 27/0081 |
| 2020/0386947 | A1* | 12/2020 | Waldern | G02B 6/3522 |
| 2020/0400955 | A1* | 12/2020 | Messer | G06F 3/017 |

FOREIGN PATENT DOCUMENTS

| | | |
|---|---|---|
| EP | 4288695 | 12/2023 |
| KR | 202000002791 A | 1/2020 |
| KR | 20230133860 A | 9/2023 |
| WO | 2016020643 | 2/2016 |
| WO | 2018178626 | 10/2018 |
| WO | WO-2019115998 A1 | 6/2019 |
| WO | WO-2020009788 A1 | 1/2020 |
| WO | WO-2020188234 A1 | 9/2020 |
| WO | WO-2022167125 A1 | 8/2022 |

OTHER PUBLICATIONS

"International Application Serial No. PCT/EP2021/084652, International Search Report mailed Feb. 28, 2022", 3 pgs.
"International Application Serial No. PCT/EP2021/084652, Written Opinion mailed Feb. 28, 2022", 7 pgs.
"European Application Serial No. 21836066.7, Communication pursuant to Rules 161(1) and 162 EPC mailed Sep. 12, 2023", 3 pgs.
"European Application Serial No. 2136066.7, Response filed Feb. 13, 2024 to Office Action mailed Sep. 12, 2023", 42 pgs.
"International Application Serial No. PCT/EP2021/084662, International Preliminary Report on Patentability mailed Aug. 17, 2023", 9 pgs.
"European Application Serial No. 21836066.7, Response to Communication pursuant to Rules 161(1) and 162 EPC filed Feb. 13, 2024", 42 pgs.
"Korean Application Serial No. 10-2023-7025210, Notice of Preliminary Rejection mailed Apr. 28, 2025", w/ English translation, 12 pgs.

* cited by examiner

DEVICE AND METHOD FOR COMPENSATING EFFECTS OF PANTOSCOPIC TILT OR WRAP/SWEEP TILT ON AN IMAGE PRESENTED ON AN AUGMENTED REALITY OR VIRTUAL REALITY DISPLAY

CLAIM OF PRIORITY

This application is a U.S. national-phase application filed under 35 U.S.C. § 371 from International Application Serial No. PCT/EP2021/084652, filed on Dec. 7, 2021, and published as WO 2022/167125 on Aug. 11, 2022, which claims the benefit of priority to EP patent application Ser. No. 21/155,624.6, filed on Feb. 5, 2021, each of which is incorporated herein by reference in its entirety.

TECHNICAL FIELD

The present disclosure relates to optical devices suitable for use in displays such as augmented reality or virtual reality displays. Such optical devices typically comprise a waveguide and diffractive optical elements for coupling light into and out of the waveguide. Virtual reality and augmented reality displays include wearable devices, such as glasses, displays for video games, and screens for military or transportation applications.

BACKGROUND

An augmented reality device typically includes a transparent display screen element that enables a user to perceive data that is displayed on the screen whilst also being able to view the real-world through the display element at the same time. The display screen may be a glass waveguide, which receives data from a projector that directs light to a surface of the waveguide. Such a display screen may be provided as a pair of glasses for near eye usage or it may be part of a head-up-display implementation, typically used in a motor vehicle or an aircraft, for example. Illuminating light from the projector is coupled into the waveguide by an input diffraction grating. Once light has coupled into the waveguide it undergoes total internal reflection within the waveguide. When the light undergoing total internal reflection within the waveguide is incident on an output diffraction grating a portion of the light is directed out of the waveguide toward the eye of a user. The projector can thus provide information and/or images that augment a user's view of the real-world.

In such displays, the projected light typically enters the waveguide as a single input pupil, which is propagated through the waveguide to yield a plurality of exit pupils, which are coupled out of the waveguide towards the eye of a user. An exit pupil is a virtual aperture for the projected light on the surface of the waveguide and, in order for the user to see the projected light, the user's eye must be aligned with the exit pupil. The user will typically move their eye to various alignments when observing the real-world through the display screen, and the augmented reality component should desirably be viewable regardless of where the user is looking, within a defined region of the display, referred to as an eyebox. In order to provide augmented reality images, regardless of the direction of the user's gaze within the eyebox, it is common to provide exit pupil expansion and replication, where multiple exit pupils are coupled towards the user at different points within the eyebox. As the user moves their eye, it becomes aligned with exit pupils at different points on the waveguide, and the augmented reality component remains visible.

An optical device is disclosed in WO 2016/020643 for expanding input light in two dimensions in an augmented reality display. An input diffractive optical element is provided for coupling input light from a projector into a waveguide. The optical device also includes an output element having two diffractive optical elements overlaid on one another in the waveguide so that each of the two diffractive optical elements can receive light from the input diffractive optical element and couple it towards the other diffractive optical element in the pair, which can then act as an output diffractive optical element which couples light out of the waveguide towards a viewer. In one embodiment the two diffractive optical elements overlaid on one another are provided in a photonic crystal. This is achieved by having an array of pillars arranged within or on the surfaces the waveguide, having an increased refractive index relative to the surrounding waveguide medium. The pillars in WO 2016/020643 are described as having a circular cross-sectional shape when viewed in the plane of the waveguide, from the perspective of a viewer. Another arrangement is described in WO2018/178626 in which the optical structures have different cross-sectional shapes when viewed in the plane of the waveguide.

These configurations have been found to be effective for an arrangement where light can be projected into the waveguide in a direction that is parallel to a waveguide normal vector. However, for practical devices it is sometimes necessary to project light into the waveguide at different angles, and this can introduce issues and complications with the light that is provided to a viewer.

An object of the present invention is to provide an optical device that can be used for a wider variety of projector angles. In other words, an object of the invention is to increase the flexibility with which the optical device can be accommodated within a headset.

SUMMARY OF THE INVENTION

According to an aspect of the present invention there is provided an optical device for use in an augmented reality or virtual reality display, comprising: a waveguide; an input diffractive optical element positioned in or on the waveguide, configured to receive light from a projector and couple it into the waveguide so that it is captured within the waveguide under total internal reflection, wherein the input diffractive optical element has an input grating vector in the plane of the waveguide; a first diffractive optical element and a second diffractive optical element having first and second grating vectors respectively in the plane of the waveguide, wherein the first diffractive optical element is configured to receive light from the input diffractive optical element and to couple it towards the second diffractive optical element, and wherein the second diffractive optical element is configured to receive light from the first diffractive optical element and to couple it out of the waveguide towards a viewer, wherein the input grating vector, the first grating vector and the second grating vector have different respective magnitudes, and wherein a vector addition of the input grating vector, the first grating vector and the second grating vector sums to zero.

In this way, a graphical representation of the vector addition resembles a scalene triangle where each side has a different length. It has been found that this produces an asymmetric expansion of light that can compensate for an asymmetry introduced by an input angle between the projector relative to the input grating in or on the waveguide. This can advantageously allow waveguides to be incorporated within headsets even though there is an angle between the projector and the waveguide that would otherwise introduce undesirable optical effects. Specifically, this can improve the ability of industrial designers to incorporate pantoscopic or wrap tilt angles into augmented reality or virtual reality headsets.

In one embodiment the first and second diffractive optical elements may be overlaid on one another in or on the waveguide. This advantageously provides a more compact footprint on the waveguide by simultaneously expanding light within the waveguide and coupling light out of the waveguide.

The device preferably comprises an output element that comprises a plurality of optical structures, wherein the plurality of optical structures are arranged in an array to provide the first and second diffractive optical elements, wherein each of the first and second diffractive optical elements is configured to receive light from the input diffractive optical element and couple it towards the other diffractive optical element which can then act as an output diffractive optical element, providing outcoupled orders towards a viewer. The plurality of optical structures are preferably in a photonic crystal. Regular variations in refractive index across the photonic crystal can produce the array that creates the first and second diffractive optical elements.

The array may comprise a plurality of unit cells where each unit cell is in the shape of a parallelogram having four side with two pairs of sides having unequal length, and wherein at least one optical structure is provided within each unit cell. The optical structure within each unit cell may have a shape that includes a plurality of straight sides forming a closed polygon. Preferably at least some of the straight sides of each optical structure are parallel with the sides of the parallelogram unit cell. The array comprises a pair of lattice vectors having unequal magnitude, and a pair of grating vectors that also have unequal absolute magnitudes. The grating vectors are preferably oriented in directions that are orthogonal to the lattice vectors.

Each optical structure may have a shape that is formed by two overlapping parallelograms. The overlapping parallelograms are preferably geometrically similar. This can create a notched parallelogram shape for the optical structures. It has been found that this arrangement advantageously reduces the amount of light that is coupled out towards a viewer along a central strip that is parallel with the direction in which light is coupled towards the array from the input diffractive optical element. The choice of shape for the optical structure can therefore improve the uniformity of the angular image which is coupled to the viewer.

Each optical structure may have a shape that includes curved sides. For example, the optical structure may be in the shape of a circle or ellipse. The optical structure may also include a combination of curved and straight sides. It is envisaged that the optical structure may be of arbitrary shape without detracting from the advantageous effects offered by the invention.

The waveguide preferably has two major surfaces each of which have normal vectors and the first and second diffractive optical elements may be separated from one another in a direction that is parallel to the respective normal vectors. In another arrangement the first and second diffractive optical elements are separated from one another along an axis that is perpendicular to the respective normal vectors. This can provide first and second diffractive optical elements that are laterally separated from one another in or on the waveguide. The first and second diffractive optical elements may be provided on the same major surface of the waveguide or on different respective major surfaces.

The optical device may include a projector configured to project light towards the input diffractive optical element. The projector is preferably angled to direct light towards the input diffractive optical element so that it subtends a non-zero angle to a plane defined by a waveguide normal vector and the input grating vector. The angle is preferably up to around 10 to 15 degrees.

According to another aspect of the invention there is provided an augmented reality or virtual reality headset comprising: the optical device defined above, and a frame that can be mounted on a user's head, comprising a side arm that extends from a user's ear to the side of their brow, and wherein the projector is mounted on the side arm. In this configuration the projector may be configured to inject light into the waveguide at a position that is to the side of a user's eyes. This is known as side injection. The waveguide is preferably inclined with pantoscopic tilt (i.e. with a non-zero pantoscopic tilt angle). The configuration of the waveguide can correct for deleterious optical effects that, without correction, would be introduced by the position of the projector and the inclusion of a non-zero pantoscopic tilt angle.

According to another aspect of the invention there is provided an augmented reality or virtual reality headset comprising: the optical device defined above, and a frame that can be mounted on a user's head, wherein the projector is mounted on the frame at a position above a user's eye. This is known as top injection. The waveguide is preferably inclined with wrap or sweep tilt (i.e. with a non-zero wrap or sweep tilt angle). The configuration of the waveguide can correct for deleterious optical effects that, without correction, would be introduced by the position of the projector and the inclusion of a non-zero wrap or sweep tilt angle and/or inclined with pantoscopic tilt (i.e. with a non-zero pantoscopic tilt angle). The configuration of the waveguide can correct for deleterious optical effects that, without correction, would be introduced by the position of the projector and the inclusion of a non-zero wrap or sweep tilt angle.

The waveguide may be arranged within the headset with both pantoscopic tilt and wrap or sweep tilt. Also, the position of injection to the waveguide may be laterally and vertically offset from the position of the output element, which is sometimes referred to as corner injection.

According to yet another aspect of the invention there is provided a method of manufacture of a waveguide for an augmented reality or virtual reality display, comprising the steps of: providing a waveguide; positioning an input diffractive optical element in or on the waveguide, configured to receive light from a projector and couple it into the waveguide so that it is captured within the waveguide under total internal reflection, wherein the input diffractive optical element has an input grating vector in the plane of the waveguide; positioning a first diffractive optical element and a second diffractive optical element having first and second grating vectors respectively in the plane of the waveguide, wherein the first diffractive optical element is configured to receive light from the input diffractive optical element and to couple it towards the second diffractive optical element, and wherein the second diffractive optical element is configured to receive light from the first diffractive optical element and to couple it out of the waveguide towards a viewer, wherein the input grating vector, the first grating vector and the second grating vector have different respective magnitudes, and wherein a vector addition of the input grating vector, the first grating vector and the second grating vector sums to zero.

DETAILED DESCRIPTION

Figure 1:
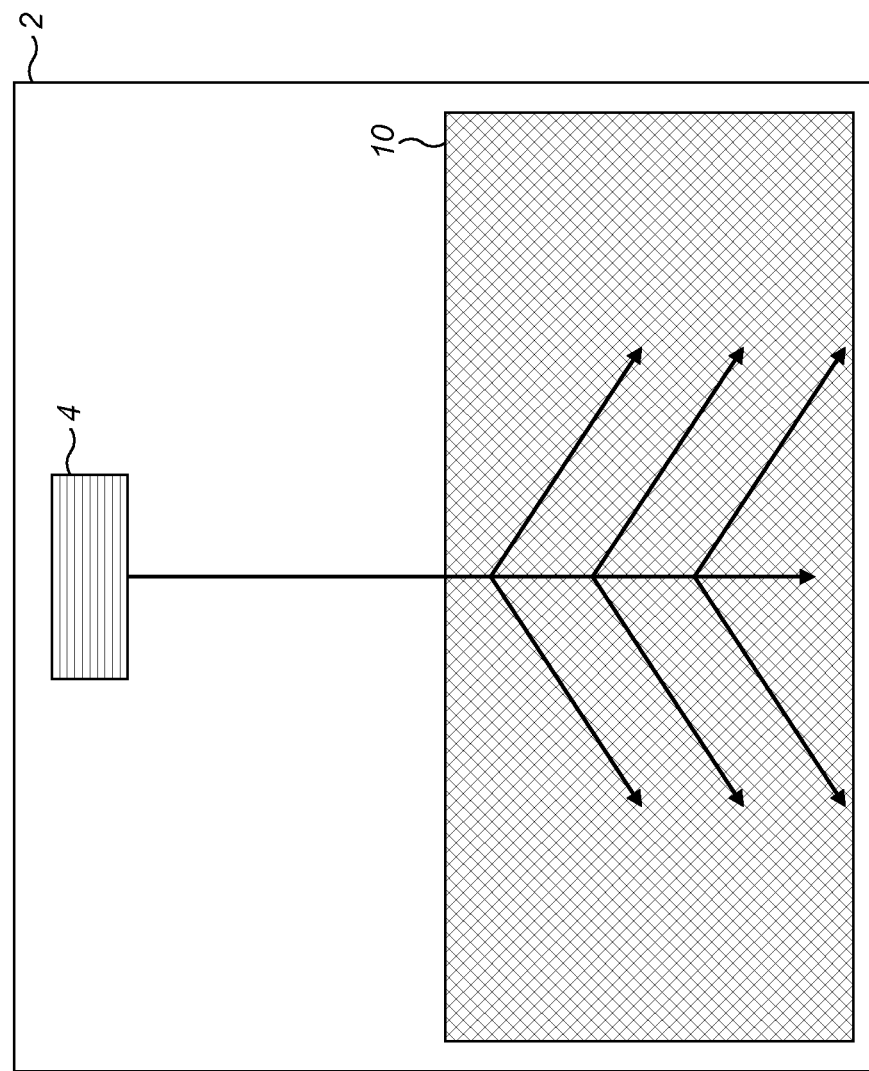
FIG. 1 is a top view of a known waveguide.

FIG. 1 is a top view of a known waveguide 2 with an input grating 4 and an output element 10. A projector (not shown) provides an input light ray in a direction that is generally parallel with the z-axis; in other words, in a direction that is generally parallel with a waveguide normal vector. Light from the projector is received at the input grating 4 and is diffracted so that it is coupled into the waveguide 2. The captured light then propagates by total internal reflection within the waveguide 2 towards the output element 10. When light encounters the output element 10 a portion of light is diffracted out of the waveguide 2 toward the eye of a viewer as an exit pupil, and another portion of the light undergoes internal diffraction within the waveguide 2, thereby expanding light rays in two dimensions. As a consequence the number of diffraction events resulting in exit pupils is greatly increased.

As explained above, the incoming light from a projector representing the centre of the image is generally parallel with the z-axis, or is, at least, generally parallel with the y-z plane. In some arrangements, however, it is desirable to provide input light so that it forms a non-zero angle with the y-z plane. This can arise under certain circumstances, and potentially due to the fitment of the waveguide 2 and the projector within a frame of a headset.

Figure 2B:
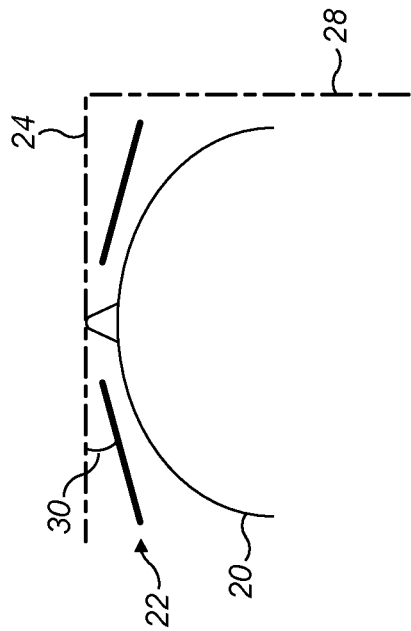
FIG. 2B is a top view of the head of a person in relation to an augmented reality waveguide with wrap or sweep tilt.
Figure 2A:
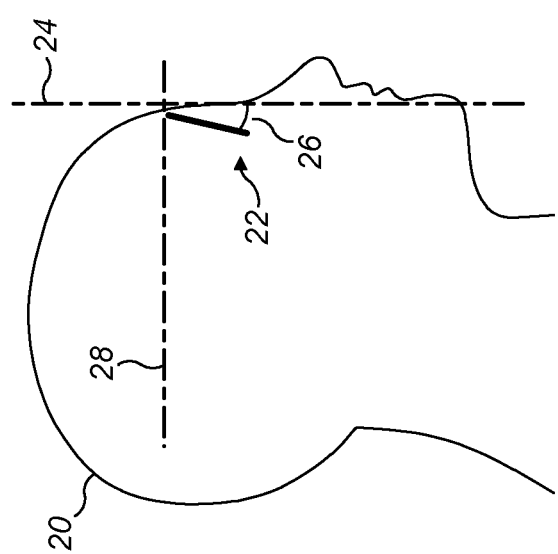
FIG. 2A is a side view of the head of a person in relation to an augmented reality waveguide with pantoscopic tilt.

FIG. 2A depicts a side on view of the head 20 of a person in relation to an augmented reality waveguide 22 relative to a vertical plane 24 and a horizontal plane 28. FIG. 2B depicts a view from above the person's head 20, showing the position of the waveguide 20 relative to the vertical plane 24 and the horizontal plane 28.

In FIG. 2A the waveguide 22 is at an angle of inclination 26 relative to vertical plane 24 such that the waveguide 22 slopes inwards from the position of the eyebrow towards the cheek. This angle of inclination is referred to as pantoscopic tilt by those skilled in the ophthalmic arts. In FIG. 2B the waveguide 22 is at an angle of inclination 30 relative to the vertical plane 24, such that the waveguide 22 is tilted along a path from the nose on the front of the head towards the ears on the side of the head; such inclination being referred to as wrap or sweep tilt by those skilled in the ophthalmic arts. The waveguide 22 may further (not shown) be subjected to both pantoscopic and wrap tilt.

Industrial designers may introduce both pantoscopic and wrap tilt into the design of augmented reality waveguides in order to achieve an appealing aesthetic design to the glasses they are creating. Pantoscopic tilt is generally recommended since it helps achieve a close fit by balancing the vertex in the 90 degree meridian (vertical plane 24). In addition, the introduction of a particular pantoscopic tilt may help to maximize the amount of bridge surface resting on the nose, thus improving the fit and comfort of the glasses. Wrap or sweep tilt takes into account the natural shape of the head, and extends the un-occluded range of the horizontal field of view (FOV) of the outside world that is visible to the eye through the lens in front of it.

A projector (not shown) that is used to introduce a light image into each respective waveguides can be conveniently located on the arm of a frame (not shown) that is oriented along the horizontal plane 28, that generally runs along a line from the ear to the nose, which are the normal contact points for a pair of glasses worn on the face.

An augmented reality waveguide 2, such as that shown in FIG. 1, can generally be incorporated into a headset in a "side injection" configuration or a "top injection" configuration. In the set up where the projector is located on the arm of a headset frame, side injection is preferred. In some arrangements there can even be "corner injection" configurations, which is a hybrid of side and top injection. In a side injection configuration the input grating 4 is positioned to the side of the user's eye, and the output element 10 provides an eyebox in front of their eye so that they can see augmented reality images. Applying the reference system of FIG. 1 to FIG. 2A, this means that input light which is parallel to the horizontal plane 28 forms an angle of inclination with the y-z plane. In a top injection configuration the input grating 4 is usually positioned above a user's eye, and the output element 10 is positioned in front of their eye. Again, applying the reference system of FIG. 1 to FIG. 2B, this would again provide an angle of inclination that forms an angle of inclination with the y-z plane. Thus, in certain designs, and whether due to pantoscopic tilt or wrap tilt, and any requirement to place the centre of the image at a particular angle in the viewer's field of view, light rays from the projector representing the centre of the image will impinge upon the input grating 4 such that the said rays subtend a non-zero angle of inclination to the y-z plane in the reference system of FIG. 1. It is common to have pantoscopic tilts of up to around 8 degrees. It is common to have wrap tilts of up to around 8 degrees.

Figure 3:
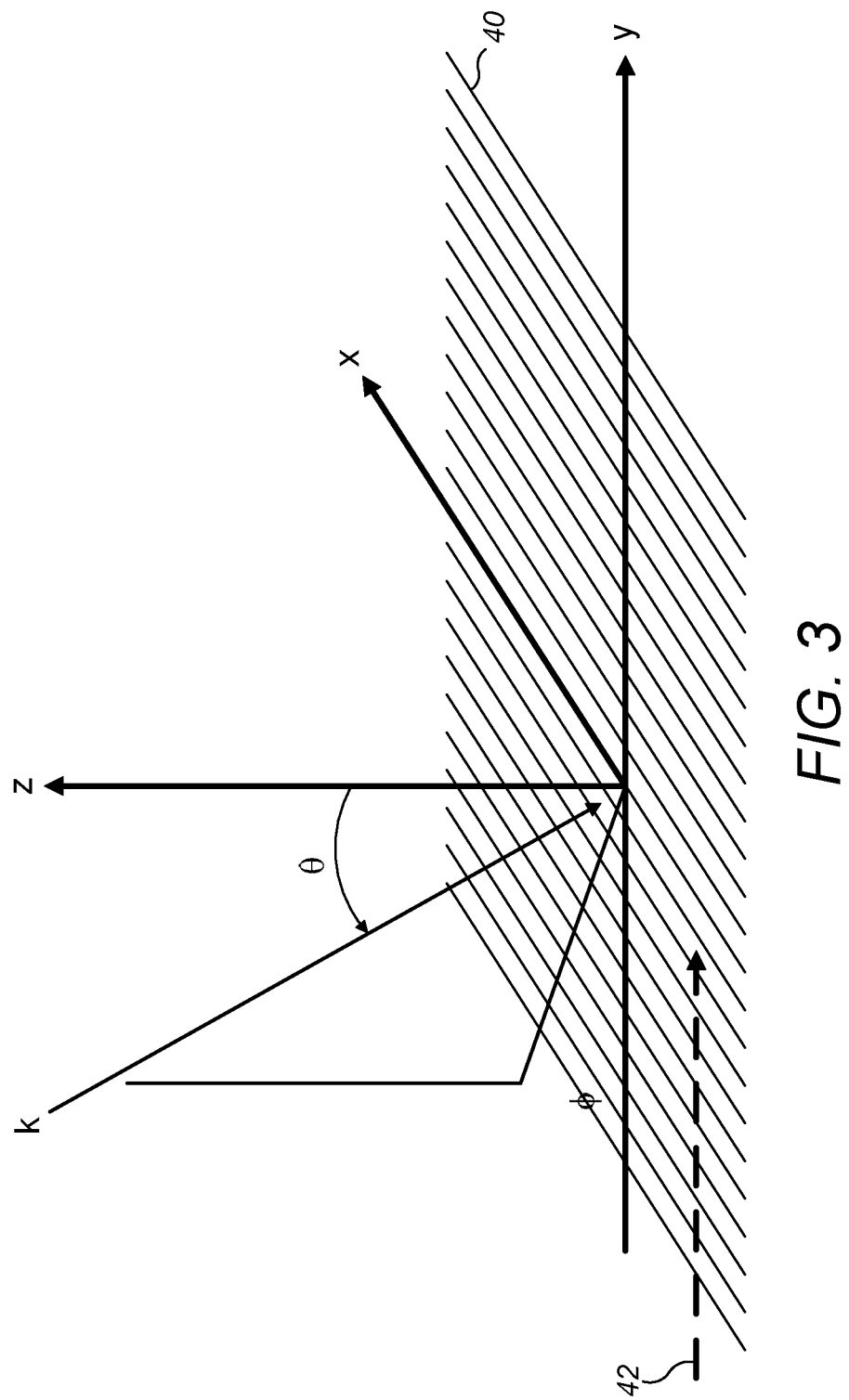
FIG. 3 is a plot in a Cartesian reference system showing the angle of incidence of an input plane wave directed towards an input grating.

FIG. 3 represents an input plane wave (defined as the k vector) directed towards the input grating 4 of FIG. 1. In this arrangement the grooves of the input grating 4 run parallel to the x-axis. The y-axis runs orthogonal to the grating lines and the z-axis is normal to the waveguide 2. The input grating 4 has a grating vector 42 which is orthogonal to the grooves of the grating, lying in the plane of the waveguide 2 (i.e. parallel to the y-axis). The pitch of grooves of the input grating defines the magnitude of the input grating vector 42.

The incoming plane wave, depicted as k-vector, represented by the polar angles θ (theta) and φ (phi), which are defined as follows with respect to FIG. 3. θ is positive for deviation away from the +z axis towards the y axis. φ is a projection of the k-vector in the x-y plane, and is positive for counterclockwise rotation around the z axis from the −y axis. This convention is for the incident plane wave (k vector) illumination.

If light is directed at the input grating 4 at an angle where φ is non-zero (i.e. the incoming light forms an angle of incidence with the y-z plane) then, without correction, undesirable optical effects may be experienced. In particular, it may be difficult to support expansion of the light within two-dimensions within the output element 10 while maintaining all wavelengths and angles of the light under total internal reflection. Wavelengths and angles that cannot be maintained under total internal reflection escape from the waveguide. A viewer may observe this as non-uniform luminance across the angular image, or as a loss of colour in the perceived image.

Figure 4:
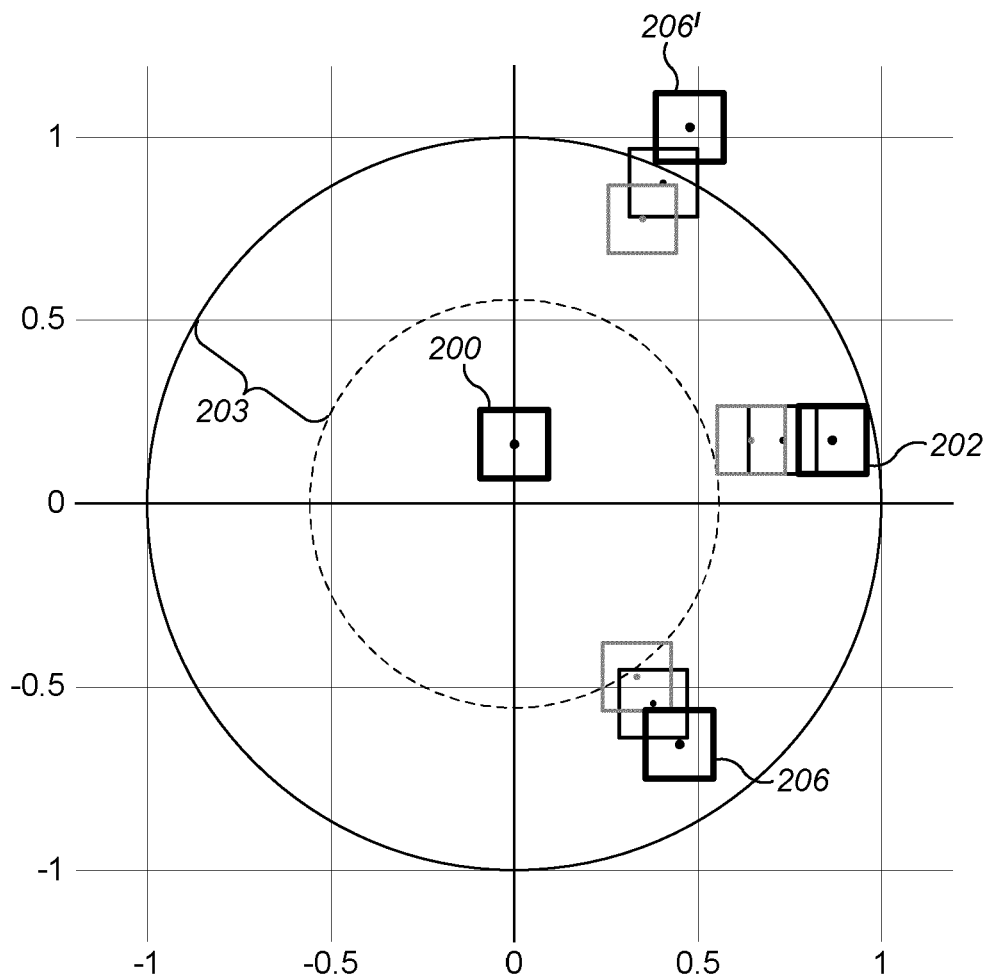
FIG. 4 is a diagram in k-space showing the position of diffracted orders within a waveguide with pantoscopic tilt and without any correction applied.

FIG. 4 is a diagram showing the position of diffracted orders within the waveguide 2 in k-space. In FIG. 4 the central box 200 represents the position of the 2D image that is received at the input grating 4 from a projector. The box with the thick black boundary represents the red image, the box with the thin black boundary represents the green image and the box with the thin grey boundary represents the blue image. The centre of the box 200 is vertically displaced from the centre of the k-space diagram due to a pantoscopic tilt between the waveguide and the projector. The orders 206 and 206' are results of diffractions from two output gratings having the same magnitude. These diffracted orders must be contained within an annulus 203 within k-space if they are to be contained under TIR. As can be appreciated, with reference to FIG. 4, without any corrective measures a significant portion of red and green image at the 1 o'clock position (206') lands outside the TIR space, which means that there will be an absence of 2D pupil replication. Further, a portion of the blue image at the 5 o'clock position will fail to totally internally reflect and will be rapidly lost.

Figure 5:
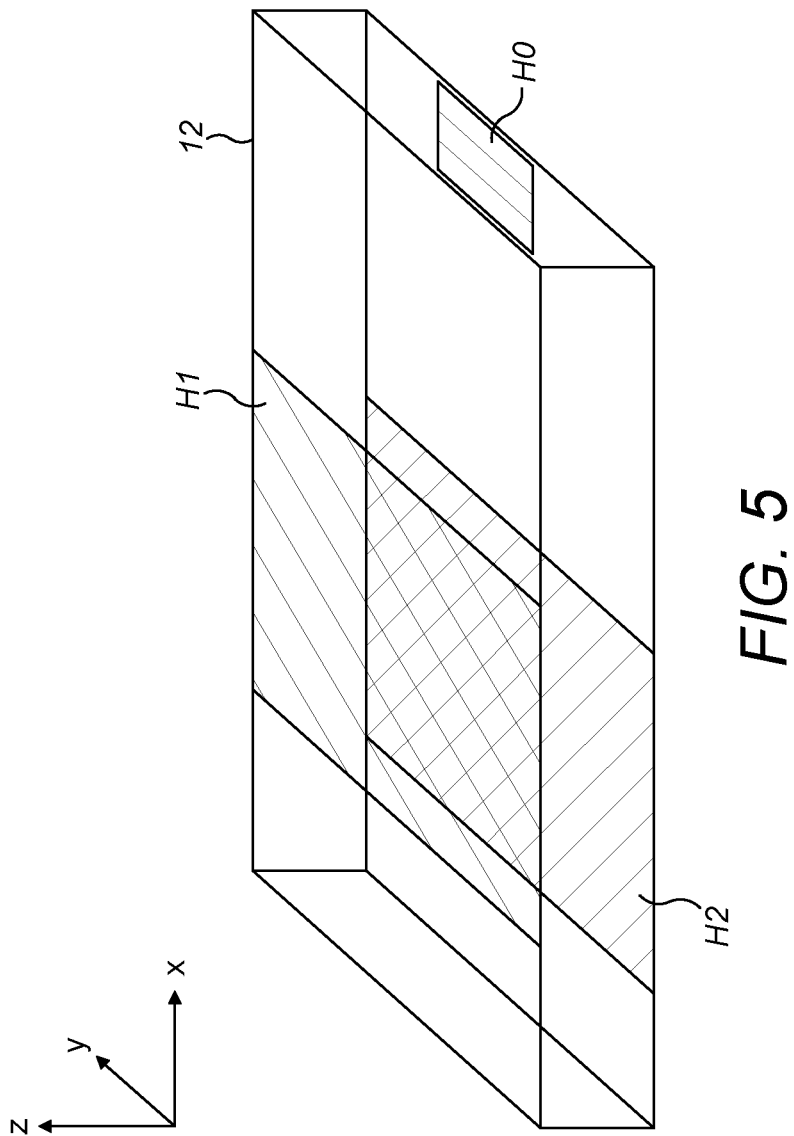
FIG. 5 is a perspective view of an optical device in an embodiment of the present invention.

FIG. 5 is a perspective view of a waveguide 12 including three linear gratings H0, H1, H2. The grooves of input grating H0 lie in the x-y plane on a first surface of the waveguide 12, are oriented parallel to the y-axis and have a grating pitch, p. The linear grating H1 is laterally separated from the input grating H0 in the x-y plane and it lies on a second surface of the waveguide 12.

The grooves of grating H1 lie in the x-y plane, are oriented at +26.56° to the x-axis, and have a grating pitch, 0.986p. The grooves of grating H2 lie in the x-y plane, are oriented at −31.07° to the x-axis, and have a grating pitch, 0.944p. The linear grating H2 is superimposed on H1 in the x-y plane and lies on the first surface of the waveguide 12, opposite to the grating H2. The crossed gratings H1, H2 are therefore separated by the thickness of the waveguide 12 in the z-axis. A grating vector can be defined for each of the gratings H0, H1, H2. The grating vector lies in the plane of the grating's grooves and extends in a direction which is at right angles to the direction of grooves. The magnitude of the vector is given by the expression, $G=2\pi/d$ where d is the pitch of the grating (i.e. the distance between adjacent grooves).

Figure 6:
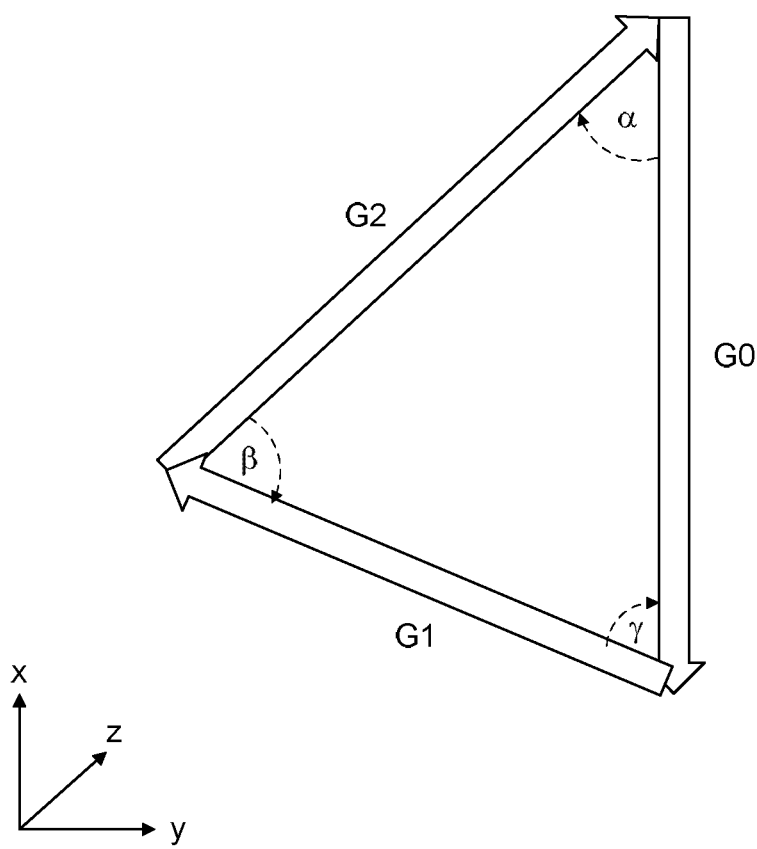
FIG. 6 is a schematic view of a combination of the grating vectors for the optical device shown in FIG. 3.

FIG. 6 is a diagram showing a vector summation of the grating vectors G0, G1, G2, corresponding to gratings H0, H1 and H2 respectively. As will be appreciated, all of the vectors G0/G1/G2 have an unequal magnitude. The vectors G0, G1, G2 can be combined to form a scalene triangle such a vector addition produces no resultant vector, or at least a resultant vector having a substantially zero magnitude. G0 subtends an angle of 63.43° relative to G1; G0 subtends an angle of 58.93° relative to G2; G1 subtends an angle of 57.64° relative to G2. In the general case, G2 subtends an angle of α with respect to G0; G1 subtends an angle of γ with respect to G0 and the angle between G2 and G1 is β. The sum of the three angles is 180 degrees.

The crossed gratings H1, H2 in this arrangement are therefore oriented asymmetrically about the x-axis. Expressed another way, the grating vectors G1 and G2 are oriented at different respective angles with respect to the input grating vector G0. It has been found that a carefully selected asymmetry in the angular relationships between the grating vectors G1 and G2, along with careful selection of grating periods, can be used to compensate for a non-zero angle of central rays from the input projector relative to the x-z plane, with reference to FIG. 5. As explained above, a non-zero angle of inclination relative to the x-z plane may be introduced in a waveguide where there is pantoscopic tilt, and light is introduced using side injection. Alternatively, this may be used in a waveguide where there is wrap or sweep tilt, and light is introduced to the waveguide using top injection. In the example given above in relation to FIGS. 5 and 6, the angular asymmetry between the grating vectors G1 and G2 can be selected to compensate for a specific pantoscopic (side injection) or sweep (top injection) tilt angle, which is 2° in this example.

For side injection, any given pantoscopic tilt angle would require a different angular relationships between the grating vectors G1 and G2 and the input grating vector G0. The precise angular relationship that will correct for the pantoscopic tilt angle is chosen based on an iterative approach. In another specific example of side injection, for a pantoscopic tilt angle of 5°, the grooves of grating H1 are oriented at +22.31° to the x-axis, and have a grating pitch, 1.032p, where p is the pitch of the input grating H0. The grooves of grating H2 lie in the x-y plane, are oriented at −35.19° to the x-axis, and have a grating pitch, 0.912p. The grating vectors G0, G1, G2 can be combined in a scalene triangle so that a vector addition sums to zero. For different specific values of pantoscopic tilt the angles of the gratings could be adjusted to achieve the desired effect and to compensate for the negative effects that would otherwise result from a non-zero pantoscopic tilt angle. The present design is intended for use in compensating for pantoscopic angles of up to around 15 degrees.

As explained in WO 2016/020643, light that encounters the waveguide 12 is diffracted and coupled into the waveguide by input grating H0. The light is then expanded in two-dimensions by the crossed gratings H1, H2 and is coupled out of the waveguide 12 towards a viewer. In this situation, light has encountered three diffraction gratings with vectors G0, G1 and G2 before it is received by a viewer. The sequence of diffraction can either be G0/G1/G2 or G0/G2/G1. Each of these grating vectors has a different magnitude. As explained above, if the vectors are added to one another then a vector diagram is obtained in the shape of a scalene triangle, having the same start and end position. The physics of diffraction gratings dictates that this arrangement provides an exit beam with the same angular and chromatic properties as the input beam.

The two examples given above were for the correction of pantoscopic tilt for side injection. A person skilled in the art will appreciate that sweep tilts can be corrected for top down injection by rotating the vector diagram in FIG. 6 through 90 degrees. In fact any sweep/pantoscopic tilt combination can be corrected for any direction of injection using the principles laid out in this document.

Figure 7:
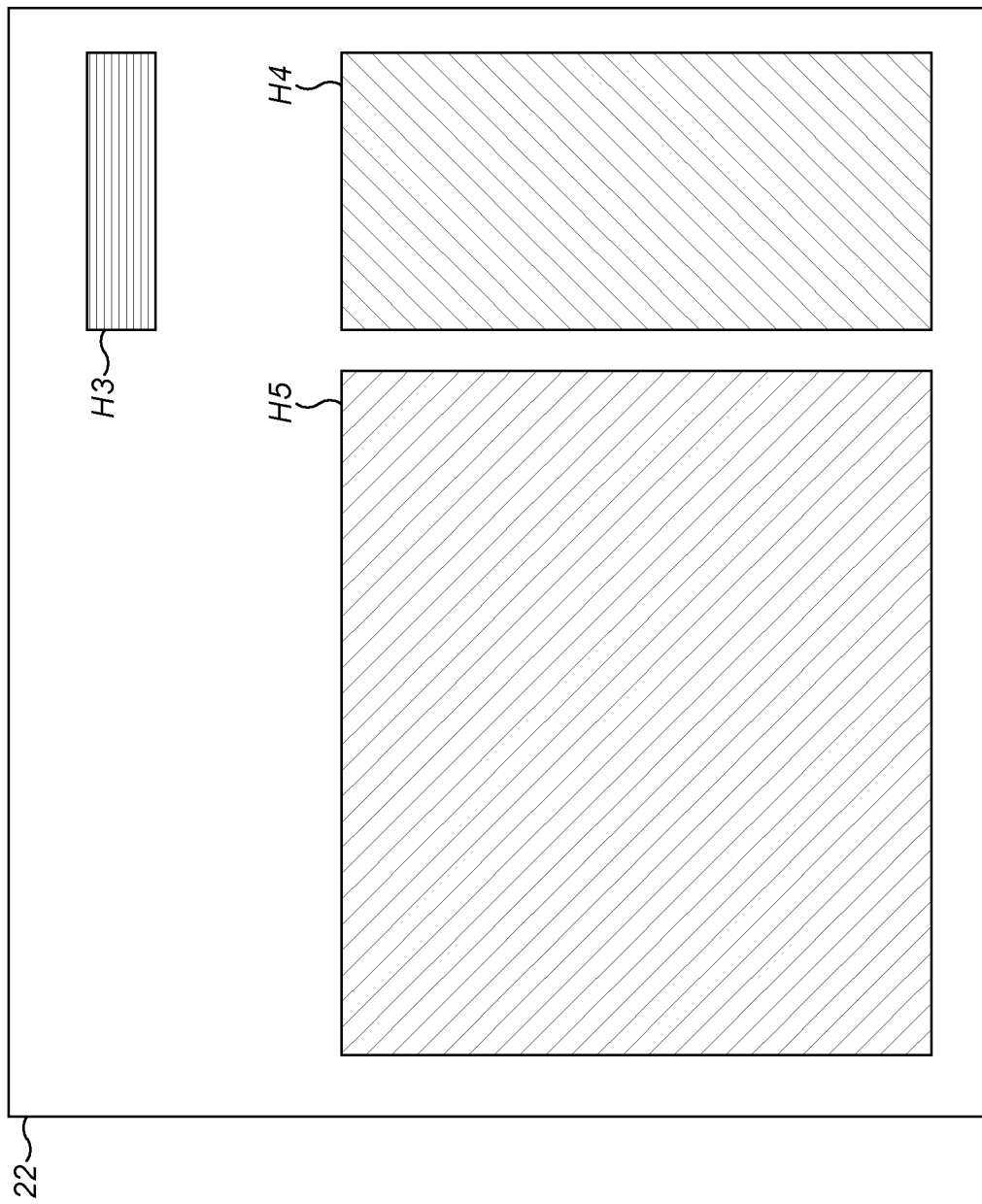
FIG. 7 is a top view of an optical device in an embodiment of the present invention.

FIG. 7 is a top view of a waveguide 22 in another embodiment of the invention including three linear gratings H3, H4, H5. The grooves of input grating H3 lie in the x-y plane on a first surface of the waveguide 12, are oriented parallel to the y-axis and have a grating pitch, p. The linear grating H4 is laterally separated from the input grating H0 in the x-y plane and it lies on a second surface of the waveguide 22. The linear grating H5 is laterally separated from both the input grating H0 and the linear grating H4 in the x-y plane, and it also lies on the second surface of the waveguide 22.

The waveguide 22 shown in FIG. 7 has been designed to compensate for a pantoscopic tilt of 2°. In other words, a 2° angle of inclination between an input light beam from the projector where it impinges on the input grating H3 and the y-z plane. To compensate for the pantoscopic tilt angle, the grooves of grating H4 lie in the x-y plane, are oriented at +26.56° to the y-axis, and have a grating pitch 0.985p. The linear grating H5 is laterally separated from H4 in the x-y plane and its grooves are oriented at −31.07° to the y-axis, and have a grating pitch, 0.944p. Thus, the grating vectors for the gratings H3, H4, H5 have the same magnitude and direction as grating vectors G0, G1, G2 described above in relation to FIGS. 5 and 6 in the example with a 2° pantoscopic tilt angle. In the same way, a vector addition of these vectors forms a scalene triangle that starts and ends at the same point (i.e. the vector addition has a resultant vector of substantially zero magnitude).

In this embodiment, light from the projector is received at the input grating H3 and is diffracted and coupled into the waveguide 22. The captured light then propagates under total internal reflection towards the linear grating H4. The linear grating H4 expands the light in one dimension, which is parallel to the y-axis. Light that encounters the linear grating H4 is partially diffracted, depending on the diffraction efficiency of the grating, in the direction of the linear grating H5. Light that is not initially diffracted by the grating H4 continues to propagate in the negative y-direction, still captured within the waveguide 22 under total internal reflection, until it encounters the grating H4 once again. At this next interaction, again light is partially diffracted in the direction of the grating H5 and is partially transmitted in the negative y-direction. This allows a one-dimensional expansion of the light within the waveguide 22. The linear grating H5 receives light from the grating H4 and partially diffracts the light, based on the diffraction efficiency of the grating H5, so that it can be coupled out of the waveguide 22 and towards a viewer along the z-axis. The grating H5 can therefore expand the light in a second direction that is parallel with the x-axis. This provides a two-dimensional eyebox from which exit pupils can be coupled out of the waveguide 22 at a plurality of positions in a two-dimensional area to provide augmented reality light to a viewer.

Figure 8:
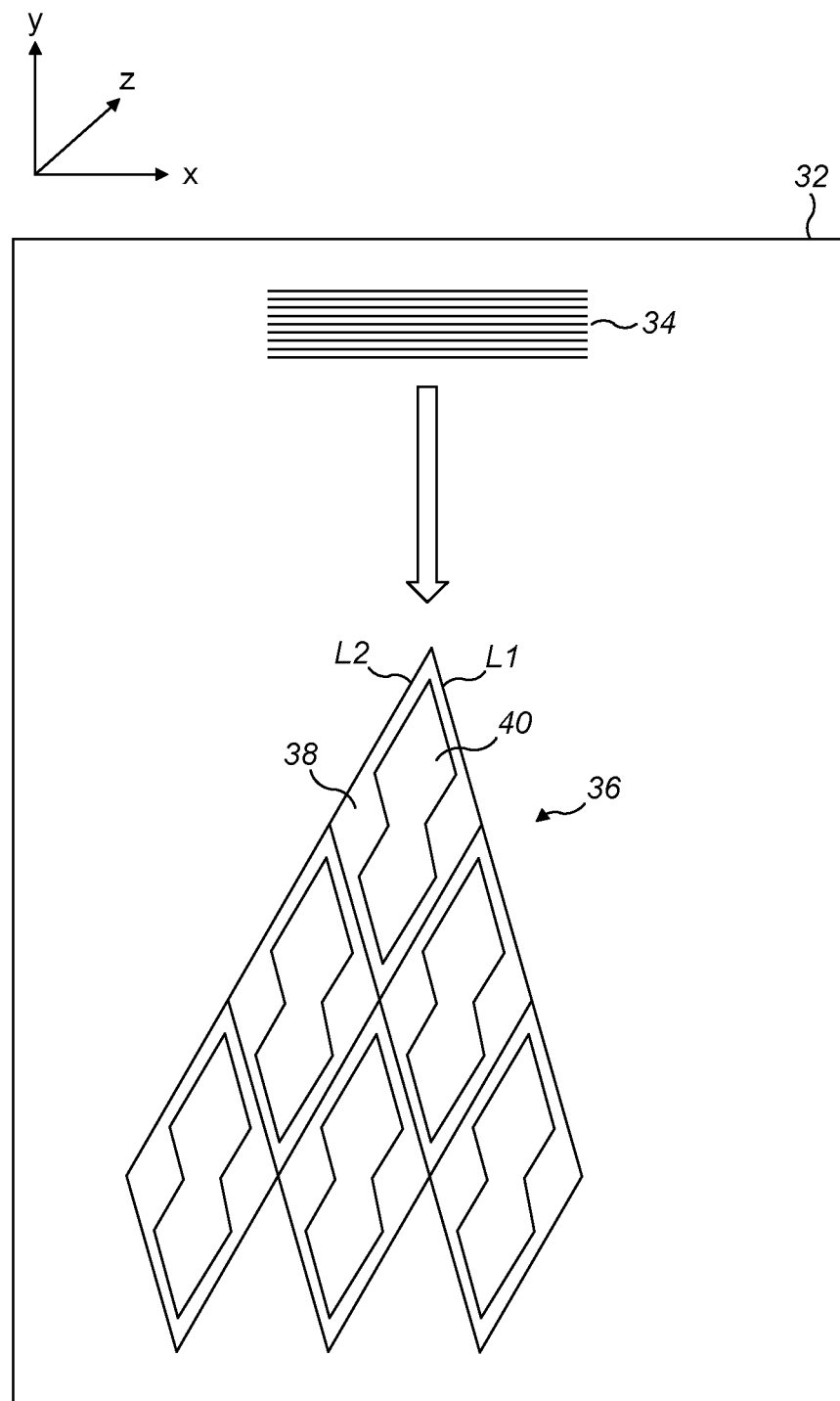
FIG. 8 is a top view of an optical device in another embodiment of the present invention.

FIG. 8 is a schematic top view of a waveguide 32 in another embodiment of the invention. In this embodiment, an input grating 34 is provided to couple light into the waveguide 32 from a projector (not shown). Light propagates within the waveguide 32 from the input grating 34 towards a photonic crystal 36. As described in WO 2016/020643 and WO2018/178626, a photonic crystal is a material in which a variable refractive index produces a regular pattern. In this example the photonic crystal 36 is in the form of a lattice having periodic nano-structures. The lattice comprises a unit cell 38 which is repeated many times. Each unit cell 38 has an optical structure 40 within it. The unit cell 38 has a parallelogram shape having a first lattice vector L1 and a second lattice vector L2 of unequal length. The optical structure within the unit cell 38 has a different refractive index to the surrounding waveguide medium. A number of different shapes may be provided for the optical structure 40 within the scope of this disclosure. In the embodiment shown in FIG. 8 the optical structure 40 is shaped as a parallelogram with notches cut into the sides. Described from a different perspective, the optical structure 40 is formed of two geometrically similar parallelograms that are partially overlapping with one another. The optical structure 40 includes sides that are parallel with the first and second lattice vectors L1, L2 in the unit cell 38.

Figure 9:
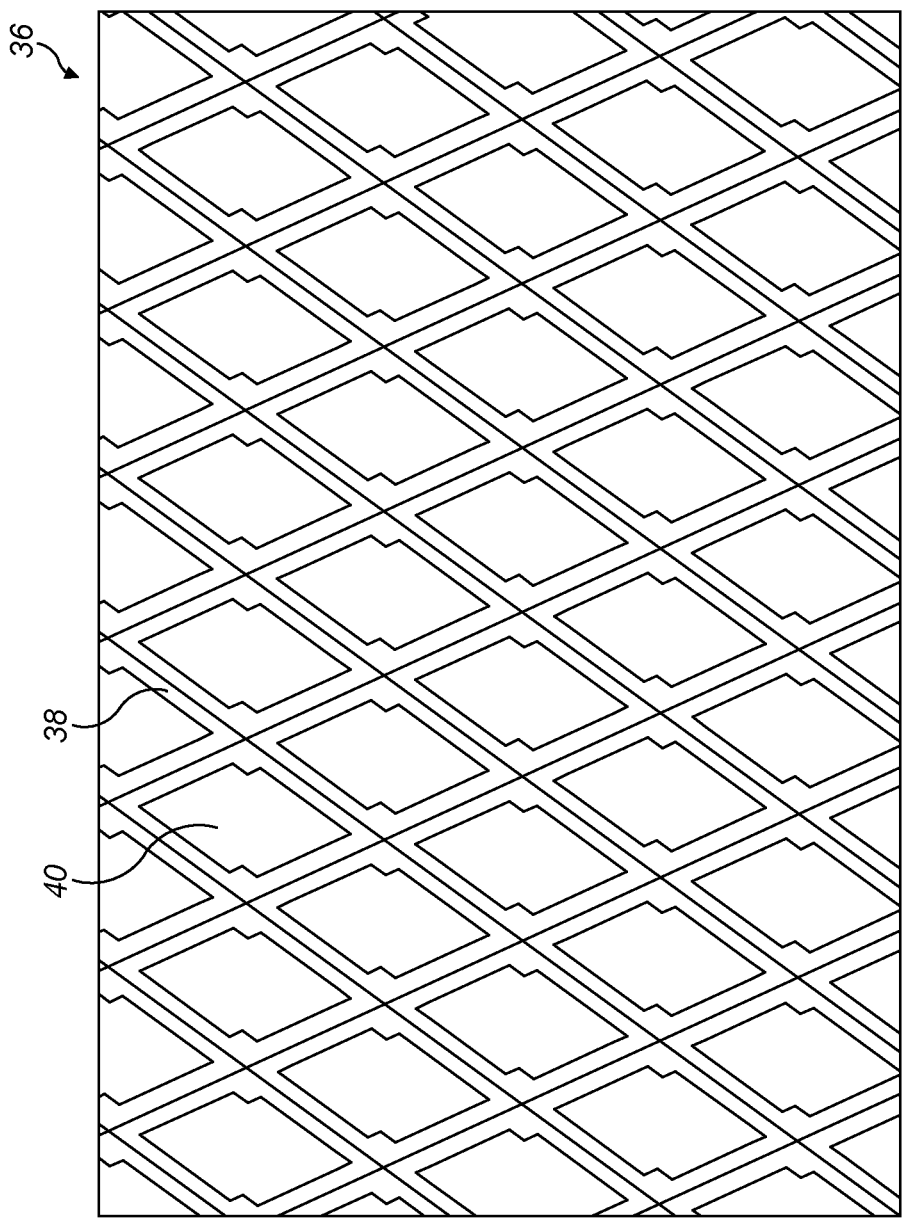
FIG. 9 is a top view of an output element with an array of unit cells for use in an optical device in another embodiment of the invention.

FIG. 9 is a top view of the photonic crystal 36 in another embodiment, showing how the unit cells 38 can be repeated. In this example, the shape of the optical structures 40 within the unit cells 38 are slightly different to those of FIG. 8. Once more, the optical structures 40 are shaped like a parallelogram with notches cut into the sides. WO2018/178626 describes a number of different shapes that may be provided for the optical structures 40 in different arrangements. The optical structures may be of arbitrary shape and still provide many advantageous effects. In some embodiments the optical structures may be shaped as circles or ellipses, or may have a combination of straight and curved sides.

Figure 10:
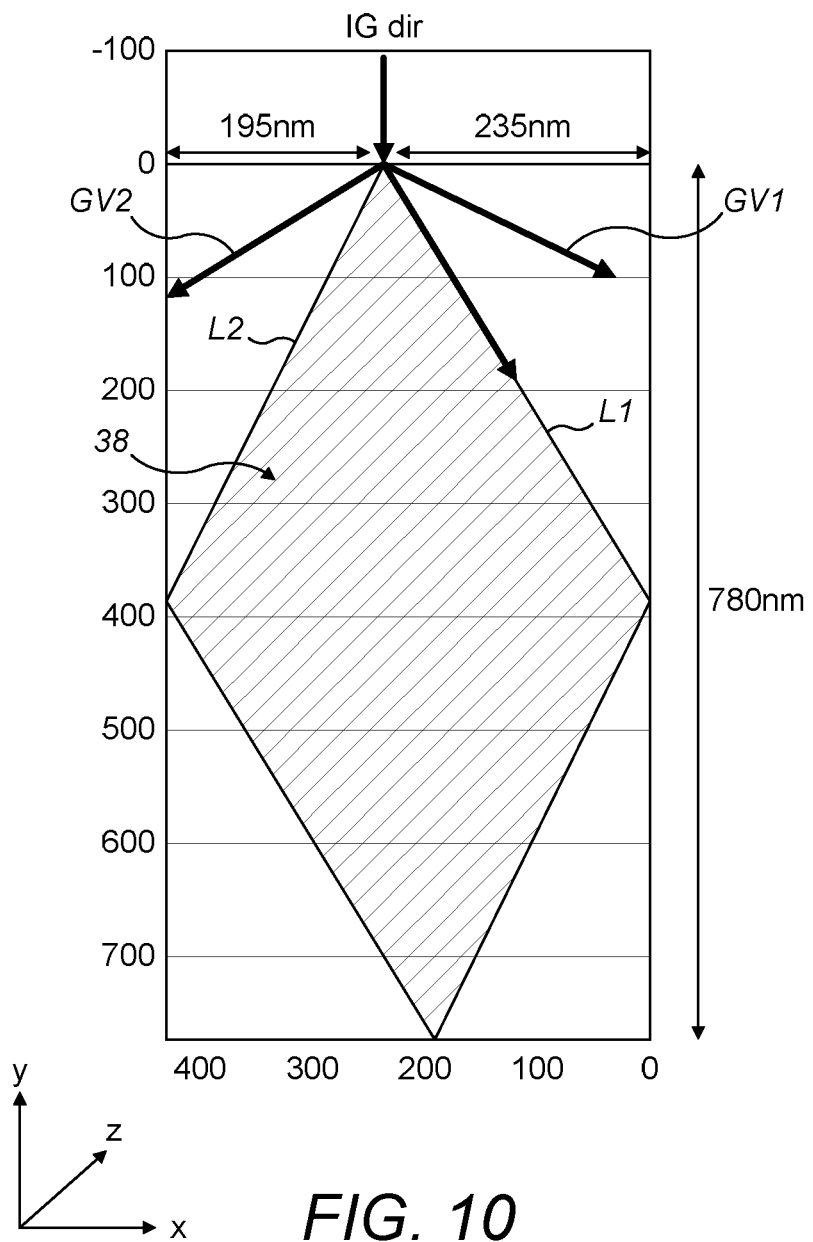
FIG. 10 is a schematic view of a unit cell in a periodic array of an output element in an embodiment of the invention.

FIG. 10 is a plan view of a single unit cell 38 in an output element that is configured to compensate for a pantoscopic tilt angle of 2°. The unit cell 38 is in the shape of a parallelogram, although it is depicted within a rectangle in FIG. 10 for ease of reference. In this example, no optical structure is shown within the unit cell so that the shape of the unit cell can be shown more clearly. It will be understood, however, that an optical structure would be provided. In this arrangement light from the input grating 34 is received in the negative y-direction. The length of the unit cell in the y-direction is 780 nm, which is twice the period of the input grating. The unit cell 38 is defined by lattice vectors L1, L2 which represents sides of unequal length in the parallelogram. In this example, L1=455.32 nm and L2=436.03 nm. The array of unit cells provides two grating vectors GV1, GV2 where, in a vector dot product, $L_1 \cdot GV_1 = 2\pi$ and $L_2 \cdot GV_1 = 0$. Thus, GV1 is orthogonal to L2 and GV2 is orthogonal to L1.

Figure 11:
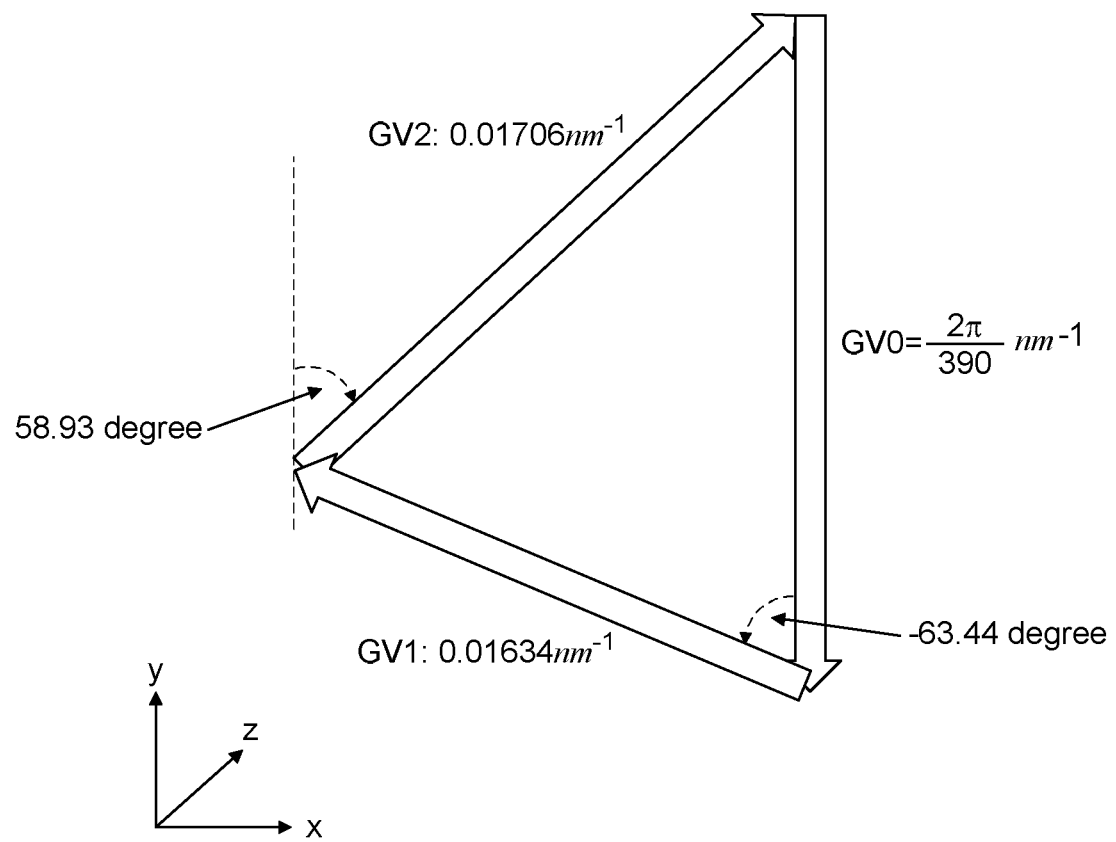
FIG. 11 is a schematic view of a combination of the grating vectors for the optical device shown in FIG. 10.

The grating vectors GV1, GV2 can be combined with the input grating vector GV0 such that they combine in a vector addition to produce a resultant vector with substantially zero magnitude. FIG. 11 is a schematic diagram showing the vector addition to compensate for a 2° pantoscopic tilt. In this example, the input grating 34 has a period of 390 nm with grooves oriented parallel to the x-axis; thus the grating vector GV0 is oriented parallel to the y-axis and has an absolute value of $$\frac{2\pi}{390} \text{nm}^{-1}.$$

GV2 has an absolute value of 0.01634 nm$^{-1}$ and an orientation of −63.44° to the y-axis. GV2 has an absolute value of 0.01706 nm$^{-1}$ and an orientation of 58.93° to the y-axis. Thus, with reference to FIG. 11, a scalene triangle is obtained with the grating vector of the input grating, and GV1, GV2. It has been found that unit cell dimensions need to be accurate at around the nanometre level in order to provide effective and accurate correction of a desired pantoscopic or wrap tilt. FIG. 11 shows GV1, GV2 as positive vectors, whereas they are depicted as negative vectors in FIG. 10.

Figure 12:
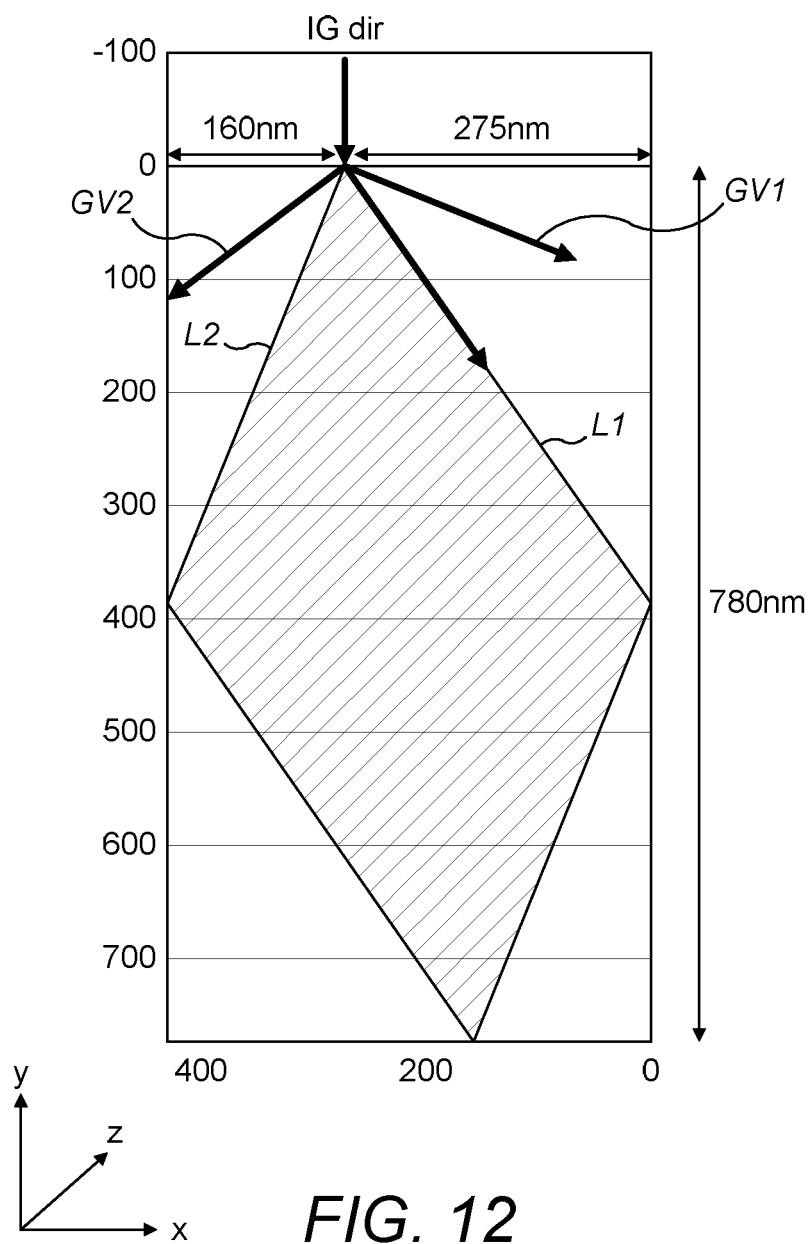
FIG. 12 is a schematic view of another unit cell in a periodic array of an output element in another embodiment of the invention.

FIG. 12 is a plan view of a single unit cell in another output element that is configured to compensate for a pantoscopic tilt angle of 5°. The length of the unit cell in the y-direction is 780 nm, which is twice the period of the input grating. The unit cell 38 is defined by lattice vectors L1, L2 which represents sides of unequal length in the parallelogram. In this example, L1=477.205 nm and L2=421.545 nm. Grating vectors GV1, GV2 are shown, as before.

Figure 13:
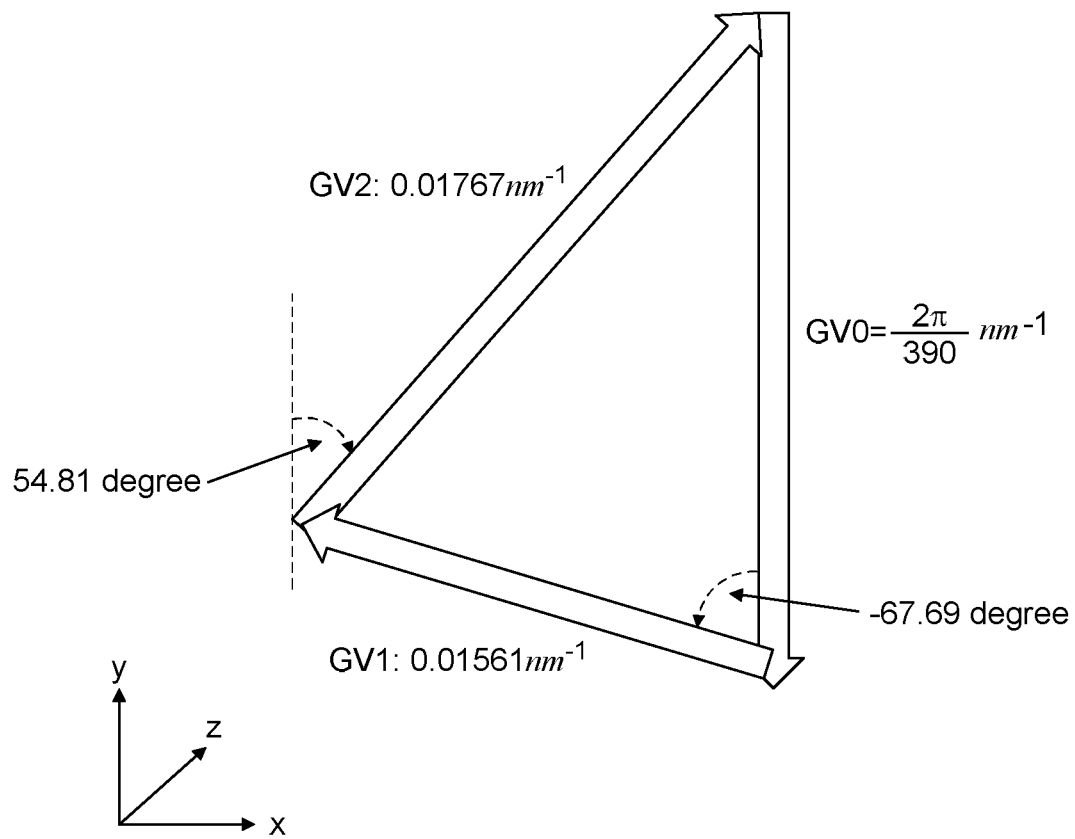
FIG. 13 is a schematic view of a combination of the grating vectors for the optical device shown in FIG. 12.

The grating vectors GV1, GV2 can be combined with the input grating vector GV0 such that they combine in a vector addition to produce a resultant vector with substantially zero magnitude. FIG. 13 is a schematic diagram showing the vector addition for an example with a 5° pantoscopic tilt. In this example, the input grating 34 has a period of 390 nm with grooves oriented parallel to the x-axis; thus the grating vector GV0 is oriented parallel to the y-axis and has an absolute value of $$\frac{2\pi}{390} nm^{-1}.$$

GV1 has an aosoiute value of 0.01561 nm$^{-1}$ and an orientation of −67.69° to the y-axis. GV2 has an absolute value of 0.01767 nm$^{-1}$ and an orientation of 54.81° to the y-axis. Thus, with reference to FIG. 13, a scalene triangle is obtained with the grating vector of the input grating, GV0, and GV1, GV2. FIG. 13 shows GV1, GV2 as positive vectors, whereas they are depicted as negative vectors in FIG. 12.

The regular arrangement of unit cells creates a number of effective diffraction gratings or diffractive optical elements. When light from the input grating 34 is incident on the photonic crystal 36 it undergoes multiple simultaneous diffractions by the various diffractive optical elements. This allows the light to be expanded in two-dimensions in the x-y plane and coupled out of the waveguide towards a viewer along the z-axis.

Figure 14:
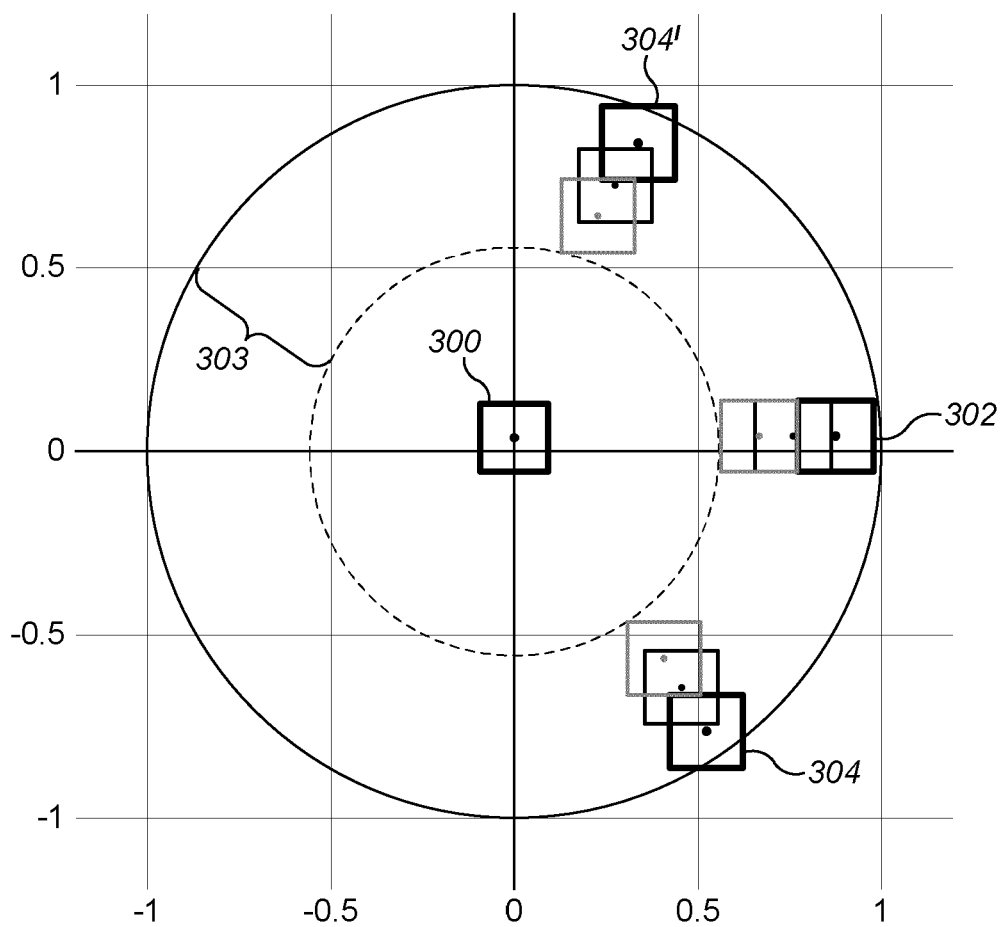
FIG. 14 is a diagram in k-space showing the position of diffracted orders within a waveguide with pantoscopic tilt with correction applied.

FIG. 14 is a diagram showing the position of diffracted orders within the waveguide 32 in k-space where pantoscopic tilt is 5°; the position of diffracted orders within k-space are adjusted so that they remain under total internal reflection and so that they are not lost from the system. Input light is received from the projector at the input grating at a central position 300. The light is then diffracted into turn order 302, 304, 304'. An annular region 303 is provided in k-space for which light is maintained under total internal reflection within the waveguide 32. Light in different wavelengths is diffracted into different positions in k-space, and this is shown with the overlapping squares at the turn orders 302, 306, 306'. These represent blue, green and red wavelengths respectively at increasing radial distances in k-space. As can be appreciated from FIG. 14, red, green and blue wavelengths are fully contained within the annular region 303 so that no light is lost from the waveguide 32. This significantly improves the quality of the augmented reality image for a viewer because it reduces luminance non-uniformities in the exit image. Specifically, the approach taken with the present invention improves uniformity intensity at points across the angular image for all wavelengths of colour.

The invention claimed is:

1. An optical device for use in an augmented reality or virtual reality display, comprising:
a waveguide;
an input diffractive optical element positioned in or on the waveguide, configured to receive light from a projector and couple it into the waveguide so that it is captured within the waveguide under total internal reflection, wherein the input diffractive optical element has an input grating vector in a plane of the waveguide; and
an output element comprising a plurality of optical structures arranged in an array to provide a first diffractive optical element and a second diffractive optical element overlaid on one another in or on the waveguide and having first and second grating vectors respectively in the plane of the waveguide, wherein the first diffractive optical element is configured to receive light from the input diffractive optical element and to couple it towards the second diffractive optical element, and wherein the second diffractive optical element is configured to receive light from the first diffractive optical element and to couple it out of the waveguide towards a viewer, wherein:
the input grating vector, the first grating vector and the second grating vector have different respective magnitudes, resulting in an asymmetry in angular relationships among the grating vectors that at least partially compensates for a non-zero angle of incidence of light from the projector received by the input diffractive optical element;
each of the first and second diffractive optical elements is configured to receive light from the input diffractive optical element and couple it towards the other diffractive optical element which can then act as an output diffractive optical element, providing outcoupled orders towards a viewer;
the array comprises a plurality of unit cells where each unit cell is in the shape of a non-rectangular parallelogram having sides of unequal length, at least one optical structure being provided within each unit cell, the at least one optical structure within each unit cell having a shape formed by two overlapping parallelograms that includes a plurality of straight sides forming a closed polygon, at least some of the straight sides of each optical structure being parallel with the sides of the parallelogram unit cell; and
a vector addition of the input grating vector, the first grating vector and the second grating vector sums to zero.

2. The optical device of claim 1, wherein the waveguide has two major surfaces which have respective normal vectors and the first and second diffractive optical elements are separated from one another in a direction that is parallel to the respective normal vectors.

3. The optical device of claim 1, wherein:
the waveguide has two major surfaces which have respective normal vectors; and
the first and second diffractive optical elements are separated from one another along an axis that is perpendicular to the respective normal vectors.

4. The optical device of claim 1, further comprising a projector configured to project light towards the input diffractive optical element, wherein the projector is angled to direct light towards the input diffractive optical element so that it subtends a non-zero angle to a plane defined by a waveguide normal vector and the input grating vector.

5. An augmented reality or virtual reality headset comprising:
the optical device of claim 4; and
a frame that can be mounted on a user's head, comprising a side arm that extends from a user's ear to the side of their brow, and wherein the projector is mounted on the side arm.

6. An augmented reality or virtual reality headset comprising:
the optical device of claim 4; and
a frame that can be mounted on a user's head, wherein the projector is mounted on the frame at a position above a user's eye.

7. A method of manufacture of an augmented reality or virtual reality display, the method comprising:
providing a waveguide;
positioning an input diffractive optical element in or on the waveguide, configured to receive light from a projector and couple it into the waveguide so that it is captured within the waveguide under total internal reflection, wherein the input diffractive optical element has an input grating vector in a plane of the waveguide; and
positioning an output element in the plane of the waveguide, the output element comprising a plurality of optical structures arranged in an array to provide a first diffractive optical element and a second diffractive optical element overlaid on one another in or on the waveguide and having first and second grating vectors respectively, wherein the first diffractive optical element is configured to receive light from the input diffractive optical element and to couple it towards the second diffractive optical element, and wherein the second diffractive optical element is configured to receive light from the first diffractive optical element and to couple it out of the waveguide towards a viewer, wherein:
the input grating vector, the first grating vector and the second grating vector have different respective magnitudes, resulting in an asymmetry in angular relationships among the grating vectors that at least partially compensates for a non-zero angle of incidence of light from the projector received by the input diffractive optical element;
each of the first and second diffractive optical elements is configured to receive light from the input diffractive optical element and couple it towards the other diffractive optical element which can then act as an output diffractive optical element, providing outcoupled orders towards a viewer;
the array comprises a plurality of unit cells where each unit cell is in the shape of a non-rectangular parallelogram having sides of unequal length, at least one optical structure being provided within each unit cell, the at least one optical structure within each unit cell having a shape formed by two overlapping parallelograms that includes a plurality of straight sides forming a closed polygon, at least some of the straight sides of each optical structure being parallel with the sides of the parallelogram unit cell; and a vector addition of the input grating vector, the first grating vector and the second grating vector sums to zero.

8. The method of claim 7, wherein the waveguide has two major surfaces which have respective normal vectors and the first and second diffractive optical elements are separated from one another in a direction that is parallel to the respective normal vectors.

9. The method of claim 7, wherein:
the waveguide has two major surfaces which have respective normal vectors; and
the first and second diffractive optical elements are separated from one another along an axis that is perpendicular to the respective normal vectors.

10. The method of claim 7, further comprising providing a projector configured to project light towards the input diffractive optical element, wherein the projector is angled to direct light towards the input diffractive optical element so that it subtends a non-zero angle to a plane defined by a waveguide normal vector and the input grating vector.

11. The method of claim 10, further comprising:
providing a frame that can be mounted on a user's head, comprising a side arm that extends from a user's ear to the side of their brow, and wherein the projector is mounted on the side arm.

12. A method, comprising:
receiving light at an input diffractive optical element positioned in or on a waveguide so that the light is captured within the waveguide under total internal reflection, the input diffractive optical element having an input grating vector in a plane of the waveguide; and
receiving light from the input diffractive optical element at a first diffractive optical element and a second diffractive optical element provided by a plurality of optical structures arranged in an array of an output element, the first diffractive optical element and a second diffractive optical element being overlaid on one another in or on the waveguide and having first and second grating vectors respectively in the plane of the waveguide;
coupling light from the first diffractive optical element towards the second diffractive optical element;
coupling light from the second diffractive optical element towards the first diffractive optical element;
coupling the light received from the first diffractive optical element at the second diffractive optical element out of the waveguide towards a viewer; and
coupling the light received from the second diffractive optical element at the first diffractive optical element out of the waveguide towards the viewer;
wherein:
the input grating vector, the first grating vector and the second grating vector have different respective magnitudes, resulting in an asymmetry in angular relationships among the grating vectors that at least partially compensates for a non-zero angle of incidence of light received by the input diffractive optical element;
the array comprises a plurality of unit cells where each unit cell is in the shape of a non-rectangular parallelogram having sides of unequal length, at least one optical structure being provided within each unit cell, the at least one optical structure within each unit cell having a shape formed by two overlapping parallelograms that includes a plurality of straight sides forming a closed polygon, at least some of the straight sides of each optical structure being parallel with the sides of the parallelogram unit cell; and a vector addition of the input grating vector, the first grating vector and the second grating vector sums to zero.

\* \* \* \* \*